(12) United States Patent
Shah et al.

(10) Patent No.: US 10,930,168 B2
(45) Date of Patent: Feb. 23, 2021

(54) METHOD AND SYSTEM FOR AGGREGATING A PLURALITY OF LEARNING TECHNOLOGIES WITH AN E-COMMERCE LAYER

(71) Applicant: Tata Consultancy Services Limited, Mumbai (IN)

(72) Inventors: Viral Prakash Shah, Mumbai (IN); Annie Dhairiamani, Mumbai (IN); Santosh Dharamanna Kusanale, Mumbai (IN); Siddhant Mahendra Jadhav, Mumbai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 343 days.

(21) Appl. No.: 15/878,918

(22) Filed: Jan. 24, 2018

(65) Prior Publication Data
US 2019/0147759 A1 May 16, 2019

(30) Foreign Application Priority Data
Nov. 15, 2017 (IN) .............................. 201721040873

(51) Int. Cl.
G09B 7/00 (2006.01)
G09B 5/06 (2006.01)
G06Q 30/06 (2012.01)
G06Q 50/20 (2012.01)

(52) U.S. Cl.
CPC ......... *G09B 5/065* (2013.01); *G06Q 30/0601* (2013.01); *G06Q 30/0635* (2013.01); *G06Q 50/20* (2013.01); *G09B 7/00* (2013.01); *G06Q 30/0625* (2013.01)

(58) Field of Classification Search
CPC ........................................................ G09B 7/00
USPC ................. 434/322, 323, 350, 362; 705/26.1
See application file for complete search history.

(56) References Cited

U.S. PATENT DOCUMENTS

| 8,271,420 B2 | 9/2012 | Everhart et al. |
| 8,417,581 B2 * | 4/2013 | Ajjarapu ................ G06Q 30/06 434/107 |
| 8,641,424 B2 * | 2/2014 | Soldavini ........... G06Q 30/0207 434/322 |

(Continued)

*Primary Examiner* — Kurt Fernstrom
(74) *Attorney, Agent, or Firm* — Finnegan, Henderson, Farabow, Garrett & Dunner, LLP

(57) ABSTRACT

A system and method for aggregating various learning technologies. It is an aggregation of various different learning technologies which may be present on any technology or framework. It comprises an enrollment service framework which enables different learning management services to integrate easily with a platform. Further, the learning content could be on any platform, technology or mode and is offered to the users through a single channel. It is an ecommerce layer over a variety of learning modes wherein publishers can place their content and enable purchase of learning technologies. Learners can avail the same in seamless and easy to use learner interface. This platform also helps learners to follow a journey of learning to application of acquired competencies in the corporates. Further, it provides a revenue management between all participating entities. It also provides an activation token engine which helps to manage enrollments/de-enrollments for different learning technologies.

12 Claims, 3 Drawing Sheets

(56) References Cited

U.S. PATENT DOCUMENTS

| | | | |
|---|---|---|---|
| 2006/0024655 A1* | 2/2006 | Bambrick | G09B 7/02 |
| | | | 434/350 |
| 2008/0070206 A1* | 3/2008 | Perilli | G06Q 10/10 |
| | | | 434/219 |
| 2010/0266999 A1* | 10/2010 | Follansbee | G09B 19/06 |
| | | | 434/322 |
| 2012/0329026 A1* | 12/2012 | Lewolt | G06Q 10/101 |
| | | | 434/322 |
| 2013/0089848 A1* | 4/2013 | Exeter | G09B 7/00 |
| | | | 434/350 |
| 2013/0171609 A1* | 7/2013 | Le Chevalier | G09B 19/00 |
| | | | 434/365 |
| 2013/0266924 A1* | 10/2013 | Zelin | G09B 7/00 |
| | | | 434/362 |
| 2015/0170534 A1 | 6/2015 | Leach | |
| 2016/0260336 A1 | 9/2016 | Chapman | |

* cited by examiner

METHOD AND SYSTEM FOR AGGREGATING A PLURALITY OF LEARNING TECHNOLOGIES WITH AN E-COMMERCE LAYER

PRIORITY CLAIM

This U.S. patent application claims priority under 35 U.S.C. § 119 to India Application No. 201721040873, filed on Nov. 15, 2017. The entire contents of the abovementioned application are incorporated herein by reference.

TECHNICAL FIELD

The embodiments herein generally relates to the field of aggregation of learning technologies and, more particularly, to a method and system for providing a platform for aggregating the plurality of learning technologies with an E-commerce layer.

BACKGROUND

In the current scenario, there are various independent learning management systems (LMSs) which are being implemented in educational institutes or in other organizations. There may be different modes of learning that is offered by an institute/governing body to the learners using multiple systems. However, there is no single aggregated layer which may help the learners to access through a single system for multiple content delivery systems. Also, there is no system which provides an ecosystem for multiple publishers and distributors of learning platform to exist in a marketplace with unique revenue models. If organizations already have an internal LMS system and would like to provide new modes of learning to their learners, they would need to rebuild the system or migrate all their learning content to a new system which is a very difficult and daunting task often limiting the organizations decision to shift towards new technology and adaptability.

The aggregation of learning technologies aims to provide a single platform for Learners to search and consume learning modes and materials which suit their needs. Further, the platform may help different publishers to setup and configure their learning content in the platform and enable trading for their applications thus monetizing them.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a system for aggregating a plurality of learning technologies. The system comprises a learner interface, a memory with a plurality set of instruction and a processor which is communicatively coupled with the memory. Further, the system comprises a platform for aggregating the plurality of learning technologies wherein the plurality of learning technologies having learning content. Further, the system comprises an enrollment service framework for integrating the plurality of learning technologies as products by respective publishers, an enrollment management module for tagging the users with the plurality of learning technologies or content delivery engines, a searching module for searching the plurality of learning technologies on the platform by one or more users and a purchase module for purchasing at least one learning technology out of the plurality of learning technologies by the one or more users wherein the purchase results in the generation of a revenue. Further, the system comprises a revenue management module for managing the revenue between the publishers and the platform owner using the revenue management module and a distribution module for distributing the purchased learning technologies by the distributor to learners and a utilization module for utilizing the learning of content by the learner on the platform.

In another aspect the embodiment here provides a method for aggregating a plurality of learning technologies wherein the plurality of learning technologies having learning content. In the next step, the method integrates the plurality of learning technologies as products by respective publishers by using an enrollment service framework of the platform. Further, in the next step the method allows one more users to search for plurality of products integrated with plurality of learning technology and tags the one or more users to a plurality of learning technologies or content delivery engine using an enrollment management module. Further, in the next step the method provides to purchase at least one learning technology out of the plurality of learning technologies by the one or more users, wherein the purchase results in the generation of the revenue and manages the revenue between the publishers and the platform owner using the revenue management module. Furthermore, in the next step the method provides to distribute the purchased learning technologies by the one or more users and utilizing the learning content by the user on the platform.

In yet another embodiment herein provides a non-transitory computer medium storing one or more instruction which when executed by a processor on a system, cause the processor to perform method for aggregating a plurality of learning technologies having learning content. In the next step, the method integrates the plurality of learning technologies as products by respective publishers by using an enrollment service framework of the platform. Further, in the next step the method allows one more users to search for plurality of products integrated with plurality of learning technology and tags the one or more users to a plurality of learning technologies or content delivery engine using an enrollment management module. Further, in the next step the method provides to purchase at least one learning technology out of the plurality of learning technologies by the one or more users, wherein the purchase results in the generation of the revenue and manages the revenue between the publishers and the platform owner using the revenue management module. Furthermore, in the next step the method provides to distribute the purchased learning technologies by the one or more users and utilizing the learning content by the user on the platform.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The embodiments herein will be better understood from the following detailed description with reference to the drawings, in which.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
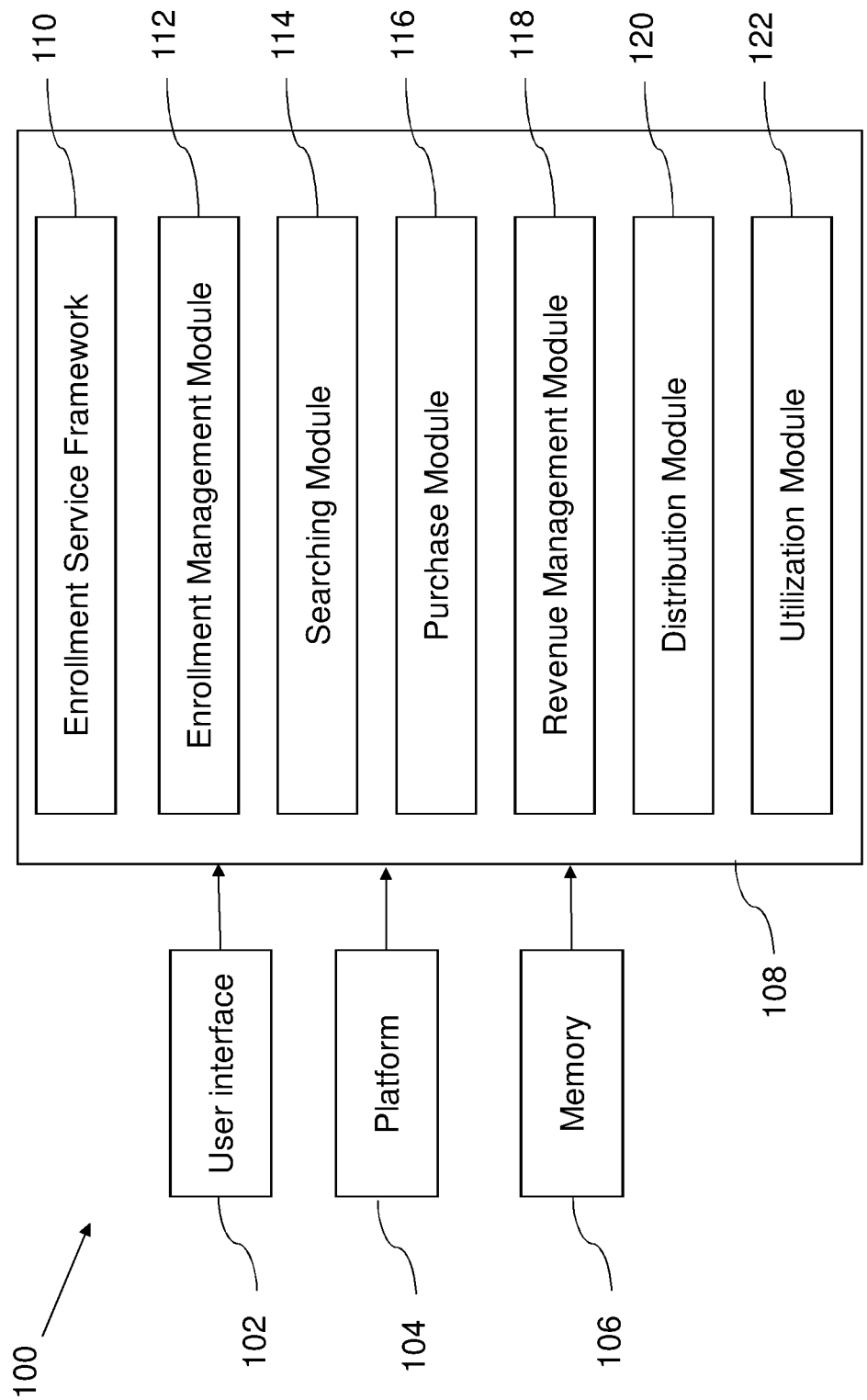
FIG. 1 illustrates a block diagram for aggregating a plurality of learning technologies according to an embodiment of the present disclosure.
Figure 2A:
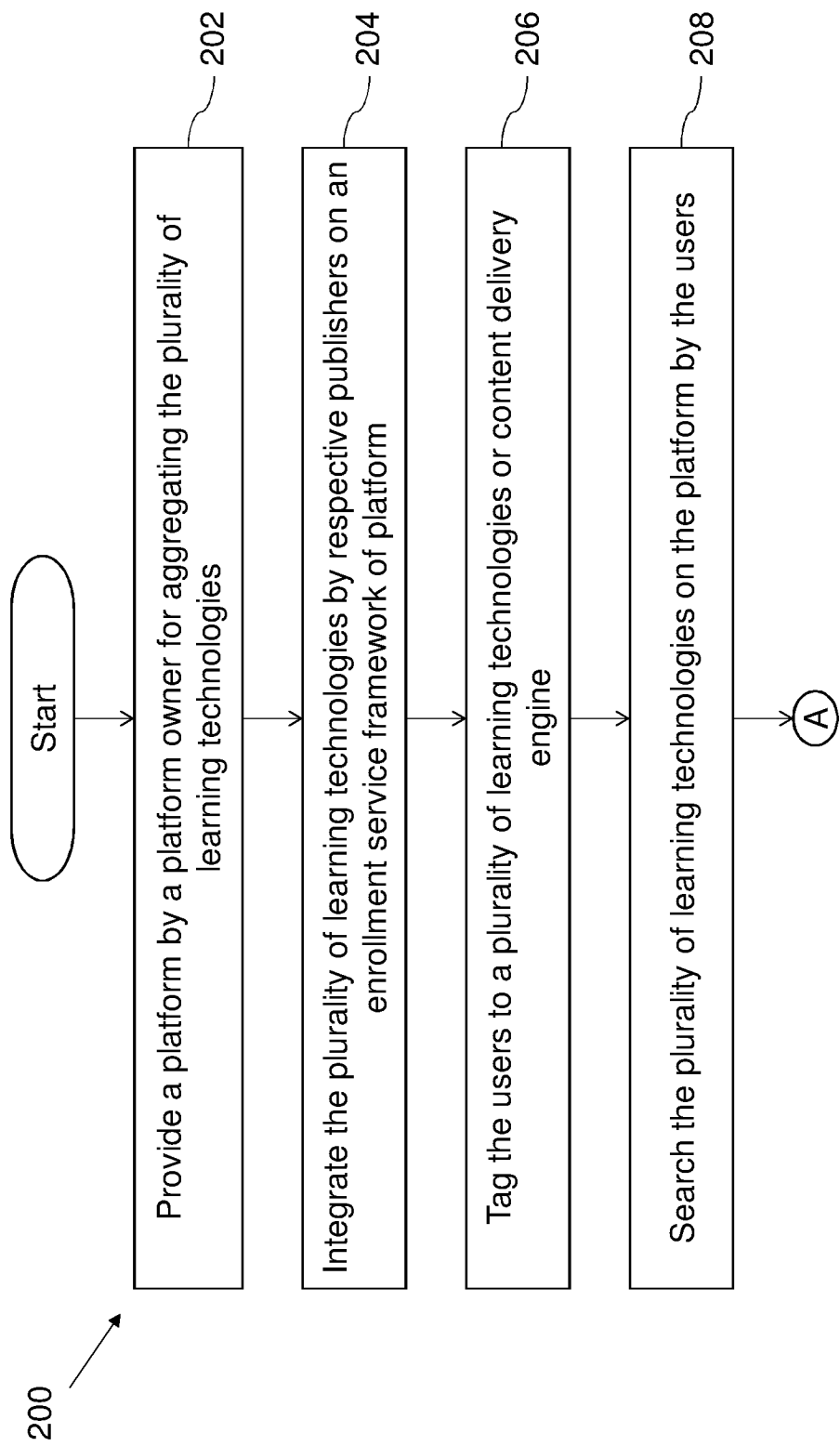
FIGS. 2(a) & 2(b) is a flowchart illustrating the steps involved in aggregating a plurality of learning technologies according to an embodiment of the present disclosure.
Figure 2B:
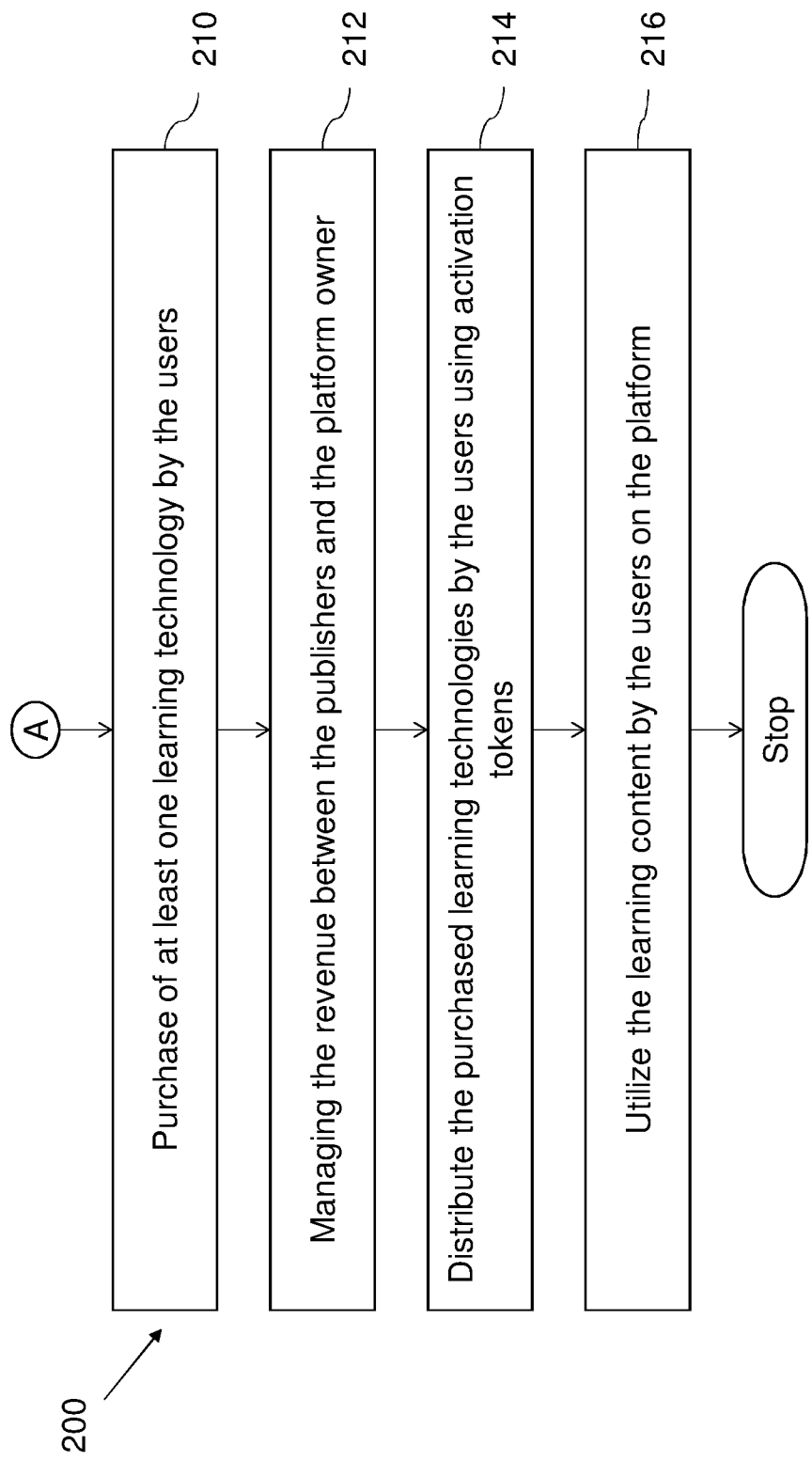

Referring now to the drawings, and more particularly to FIG. 1 through FIG. 2(a) & (b), where similar reference characters denote corresponding features consistently throughout the figures, there are shown preferred embodiments and these embodiments are described in the context of the following exemplary system and/or method.

According to an embodiment of the disclosure, a system 100 aggregating a plurality of learning technologies is shown in FIG. 1. The system 100 provides a platform for aggregating the plurality of learning technologies as product by respective publishers. The system is configured for aggregating a plurality of learning technologies wherein the plurality of learning technologies having learning content. The system 100 provides a revenue management module for managing the revenue between the publishers and the platform owner for purchase of each learning technology by the users. It is to be noted that the one or more users include, but not limited to, one or more learners and one or more distributors. Further, the one or more distributors include at least one of an organization entity. In addition to that the system 100 provides a distribution module for distributing the learning technologies by the distributors to the learners and a utilization module to support the user in utilizing the learning content shared by distributor.

It is an e-commerce layer over a variety of learning modes, wherein publishers can place their content and enable search and purchase of learning technologies. The users can avail the same in a seamless and easy to use learner interface. This platform also helps a learner to follow a journey of learning to application of acquired competencies in the corporates. Further, it provides a revenue management between all participating entities. It also provides an activation token engine which helps to manage enrollments/de-enrollments for different learning technologies.

According to an embodiment of the disclosure, the system 100 is configured for aggregating a plurality of learning technologies. It is to be noted that, the aggregation of the plurality of learning technologies are designed in two setups as a platform model and as an enterprises model. In the platform model where there exists an ecosystem of publishers, distributors, institutions and corporates other than the learners with a platform owner enabling trade between all the different participants in the system and in the enterprise model where there exists a single publisher and may or may not have distributors. For the purpose of description in this disclosure, the system 100 comprises an input/output interface 102, a memory 104 with a plurality set of instructions, a processor 106 and a platform 108. The processor 106 is in communication with the memory 104. The processor 106 is configured to execute a plurality of algorithms stored in the memory 104. The processor 106 further includes a plurality of modules for performing various functions. The plurality of modules may include, but not limited to, an enrollment service framework 112, an enrollment management module 114, a searching module 116, a purchase module 118, a revenue management module 120, a distribution module 122 and a utilization module 124 as shown in the block diagram of FIG. 1.

According to an embodiment of the disclosure the learner interface 102 is configured to provide a plurality of inputs to the processor 108. The plurality of input may be search query to be inputted by the business owner for searching the business application for his/her business. In another example, any other can also be provided to the system 100. The learner interface/input modules can include a variety of software and hardware interfaces, for example, a web interface, a graphical learner interface, and the like and can facilitate multiple communications within a wide variety of networks N/W and protocol types, including wired networks, for example, LAN, cable, etc., and wireless networks, such as WLAN, cellular, or satellite.

According to an embodiment of the disclosure, the system 100 involves four types of role players.

1. A Platform Owner: The platform owner of the system 100 is responsible for providing the platform 104 and enabling the ecosystem for the trading/selling of the plurality of searching and purchasing of at least one learning technology from the plurality of learning technologies. The platform owner is providing the platform services like learner interfaces, payment gateways, revenue split management, refund processes, product creation capabilities, subscription connector systems, partner management systems and all other systems that the different learners of the system 100 may require. The platform owner is also responsible for the search and purchase of learning approvals.

2. Publisher Organization: A publisher organization is the one who owns the learning technologies in hub and is responsible for the search and purchase with the platform 108 owner of the system 100. There can be multiple publishers in the hub. Publishers have the capability to setup product, define product to delivery engine mapping, manage learners of the organization, manage activation tokens from products and manage partnership with distributors in the system 100.

3. Distributor Organization: A distributor organization is responsible for purchasing in wholesale from a publisher organization and selling it on behalf of the publishers to the end learners. There can be multiple distributors in the system 100 each interacting with multiple publishers, manage activation tokens and manage partnership with the publishers. A learner belonging to a distributor organization will henceforth be referred as a distributor in order to better differentiate between different types of learners in the system. Distributors may hold different roles and permissions within their organizations.

4. Institution: An institution is a group having larger scope with the capabilities of both a publishers and a distributors with some more additional capabilities. It can be mapped to a real world institutional structure having classes and groups of learners with moderators/teachers and organization chains. On a high level, some of the capabilities that an institution has learner management at the organization/class/group level, activation token management, product setup and organization chain management. This type of organization is currently not in design scope and hence this document will contain organizational capabilities and learner to organization relationship only from a publishers or a distributor's perspective.

According to an embodiment of the disclosure, the system 100 includes the enrollment service framework 112 for integrating the plurality of learning technologies as product by respective publishers. It is an e-commerce layer over a variety of learning modes, wherein publishers can place their content and enable search and purchase of learning technologies.

According to an embodiment of the disclosure, the system 100 includes enrollment management module 114 for tagging a one or more users with plurality of learning technologies or content delivery engine. It is to be noted that the one or more users include, but not limited to, one or more learners and one or more distributors. Further, the one or more distributors include at least one of an organization entity. The content delivery engine supports a plurality of learning contents. The plurality of learning contents are provided in the forms of at least one or more of online courses, discussion forms and communities, events and event groups, internet based online assessments, LAN based classroom assessments, question papers for download, reading material in the form of e-books, videos or tutorials. It would be appreciated that the content delivery engine offering these one or more learning content which could be hosted on any technology, framework and platform.

According to an embodiment of the disclosure, the system 100 includes the searching module 116 for searching the plurality of learning technologies on the platform by one or more users. It is to be noted that anyone can search at least one learning technology using keywords with the matching list of keywords of the plurality of products integrated with the plurality of learning technologies. The searching module 116 is configured to filter search results based on product type, price of the product, product schedule and name of publishers one who are offering the learning technologies. It would be appreciated that the non-enrolled members can browse and search the plurality of learning technologies through the product catalogue. However, only those products would be visible to the non-enrolled members which are marked as 'yes' for display. In addition to, the searching module 116 is also configured for attributization of the product setup by the publishers. There are various attributes which defines the behavior of a product within the plurality of learning technologies. It would be appreciated that the attributes are being defined by the publishers and one or more users are able to see and interact with the products through the permutation combination of these attributes.

According to an embodiment of the disclosure, the system 100 includes purchase module 118 for purchasing at least one learning technology out of the plurality of learning technologies by the one or more users, wherein the purchase results in the generation of a revenue. To begin with the purchase, the user can buy one or more learning technologies by selecting 'buy now' given on the display. The learner can add one or more product to his cart by selecting 'Add to Cart'.

According to an embodiment of the disclosure, the system 100 includes revenue management module 120 for managing the revenue among the publishers and the platform owner. The revenue management module is configured for revenue management wherein the platform owner itself is the publisher and single payment gateway holder. It would be appreciated that the present disclosure may be implemented in an enterprise as well as in a marketplace model. In the marketplace model, revenue management includes revenue share between the publishers and the platform owner. The enterprise model is straight forward wherein the platform owner itself is the publisher and single payment gateway account holder. Further, the revenue management module configured to display both settled and not settled amounts of products purchased by the learner. It is to be noted that the platform owner receives a percentage of the value of the product purchased by the one or more users.

According to an embodiment of the disclosure, the system 100 includes distribution module 122 for distributing the purchased learning technologies by the one or more users.

According to an embodiment of the disclosure, the system 100 includes utilization module 124 for utilizing the learning of content by the one or more users on the platform.

Referring to FIG. 2, the method 200 for aggregating a plurality of learning technologies. It is an aggregation of the plurality of different learning technologies which may be present on any technology or framework. It comprises an enrollment service framework which enables different learning management services to integrate easily with a platform. It is an e-commerce layer over a variety of learning modes, wherein publishers can place their content and enable search and purchase of learning technologies. The users can avail the same in a seamless and easy to use learner interface. This platform also helps a learner to follow a journey of learning to application of acquired competencies in the corporates. Further, it provides a revenue management between all participating entities. It also provides an activation token engine which helps to manage enrollments/de-enrollments for different learning technologies.

Initially, at the step 202, where the process provides a platform by a platform owner for aggregating the plurality of learning technologies, wherein the plurality of learning technologies having learning content. The learning content is provided in the forms of at least one or more of online courses, discussion forms and communities, events and event groups, internet based online assessments, LAN based classroom assessments, question papers for download, reading material in the form of e-books, videos or tutorials.

At the step 204, where the process integrates the plurality of learning technologies as products by respective publishers by using an enrollment service framework of the platform.

At the step 206, where the process tags one or more users with the plurality of learning technologies or content delivery engine using an enrollment management module. It is to be noted that the one or more users include, but not limited to, one or more learners and one or more distributors. Further, the one or more distributors include at least one of an organization entity. The plurality of learning technologies deliver learning content to the one or more users. The users are mapped to one or more learning contents in the delivery engines through an enrollment rule defined in the system during product creation which is triggered on purchase activity of the users. Based on which product the learner has purchased, the learner gets mapped to the corresponding delivery engines as specified in the rules.

At the step 208, where the process searches the plurality of learning technologies on the platform by the user. It would be appreciated that the enrolled and non-enrolled users can use the platform for searching and purchasing the learning technologies. The enrolled users can access all products. However, the non-enrolled users are not eligible to get access of all products. They can access only those products which are marked as 'yes' for display allowed to anonymous users.

The products are filtered and displayed on the catalogue display of the platform. These are displayed as tiled of different products carrying comprehensive information of the product on the tile.

At the step 210, where the process purchases at least one learning technology out of the plurality of learning technologies by the one or more users, wherein the purchase results in the generation of the revenue. Purchase can begin with clicking/selecting on any of the action mentioned with the product tile or displayed on the platform.

In one example, if a learner wishes to purchase online the selected product immediately by clicking on 'buy now' will display a confirmation page with product details and option of payments. The learner can add the selected products to his/her cart. The learner can also directly subscribe to the selected product marked as free. Further, the learner can select activate token option which is visible on a product tile if the flag for the product purchase through activation code has been enabled and the product is a priced product. The "activate token" option enables a learner to add the selected product to his enrollments by simply entering the activation code for the product which may have been generated and distributed by the distributor or publisher.

At the step 212, where the process manages the revenue between the publishers and the platform owner using the revenue management module. The platform owner receives a percentage of the value of the product purchased either by the learners or the distributors. The final amount received by the platform owner is based on a predefined percentage base price irrespective of whether the actual order value is paid by the learners or distributor is same or discounted. Further, the revenue management supports display of both settled and non-settled amounts of the products between the various stakeholders such as distributor, learner and the platform owner.

In an example, wherein a successful order stays initially with the payment gateway provider until the provider settles the order into the escrow account. This settlement of the initial order value occurs on T+1 (Post 6.00 PM on T+1). Post this settlement, split request can be initiated with the PG which gets queued for processing until settlement into platform account has occurred. This settlement into platform account can either be carried out by the PG provider (on T+2) or by the Platform using API (immediate after split i.e. T+1). This action queues the amount for split transaction release process. A transaction release API needs to be initiated by the platform which marks the amount as settled for a publisher in the platform account and the gateway takes care of releasing these settled funds to publisher bank account internally using a Payout mechanism on T+2/T+3. The platform fees collected in this process from the publishers is also automatically transferred to the platform owner's bank account by the gateway provider.

Further, the revenue management supports refunding mechanism. It is predefined that whether the product can be refundable or non-refundable in nature. Whether a product purchase is refundable or not and how much percentage are based on a predefined configurations in the system against a product.

At the next step at 214, where the process distributes the purchased learning technologies by the distributor to the one or more users.

At the last step 216, where the process utilizes the learning content by the one or more users on the platform.

Further, the method 200 comprising the step of approving the plurality of learning technologies by the platform owner before using the products.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein provides a system and method for aggregating a plurality of learning technologies with an e-commerce layer. It is an aggregation of the plurality of different learning technologies which may be presented on any technology or framework. It comprises an enrollment service framework which enables different learning management services to integrate easily with a platform. It is an e-commerce layer over a variety of learning modes, wherein publishers can place their content and enable search and purchase of learning technologies. The users can avail the same in a seamless and easy to use learner interface. This platform also helps a learner to follow a journey of learning to application of acquired competencies in the corporates. Further, it provides a revenue management between all participating entities. It also provides an activation token engine which helps to manage enrollments/de-enrollments for different learning technologies.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a learner interface adapter that connects a keyboard, mouse, speaker, microphone, and/or other learner interface devices such as a touch screen device (not shown) to the bus to gather learner input. Additionally, a communication adapter connects the bus to a data processing network, and a display adapter connects the bus to a display device which may be embodied as an output device such as a monitor, printer, or transmitter, for example.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A method for aggregating a plurality of learning technologies, the method comprising the processor implemented steps of:
   providing a platform by a platform owner for aggregating the plurality of learning technologies with an e-commerce layer over a variety of learning modes, wherein the plurality of learning technologies having learning content;
   integrating the plurality of learning technologies as products by respective publishers using an enrollment service framework of the platform;
   searching the plurality of learning technologies on the platform by one or more users;
   purchasing at least one learning technology out of the plurality of learning technologies by at least one user, wherein the purchase results in the generation of the revenue, wherein at least one user is mapped with the learning content in a content delivery engine through an enrollment rule created during product creation and triggered on purchase activity of the at least one user;
   managing the revenue between the publishers and the platform owner using the revenue management module in an enterprise model and in a marketplace model, wherein the platform owner is the publisher and a single payment gateway account holder in the enterprise model, and in the marketplace model a revenue share is managed between the publishers and the platform owner, wherein the revenue management module supports display of both settled and non-settled amount of the products between one or more distributors, one or more learner, and the platform owner;
   utilizing the at least one learning technology by the at least one user on the platform; and
   distributing the purchased learning technologies by at least one distributor to at least one learner as activation tokens to manage enrollments or de-enrollments of the learning technologies, and also enables the at least one user to add a selected product using an activation code for the product generated and distributed by the distributor or publisher.

2. The method of claim 1, further comprising the step of approving the plurality of learning technologies by the platform owner before using the products.

3. The method of claim 1, wherein the one or more users include one or more learners and one or more distributors.

4. The method of claim 3, wherein the one or more distributors include an organization entity.

5. The method of claim 1, wherein the learning content is provided in the forms of at least one or more of online courses, discussion forms and communities, events and event groups, internet based online assessments, LAN based classroom assessments, question papers for download, reading material in the form of e-books, videos or tutorials.

6. The method of claim 1, wherein the searching is based in keywords.

7. A system for aggregating a plurality of learning technologies, the system comprises:
   a learner interface;
   a memory, and a processor, wherein the processor further comprises:
      a platform by a platform owner for aggregating the plurality of learning technologies with an e-commerce layer over a variety of learning modes;
      an enrollment management module for tagging the one or more users with the plurality of learning technologies;
      a searching module for searching the plurality of learning technologies on the platform by at least one user;
      a purchase module for purchasing at least one learning technology out of the plurality of learning technologies by the at least one user, wherein the purchase results in the generation of a revenue for the publisher and platform owner, wherein at least one user is mapped with the learning content in a content delivery engine through an enrollment rule created during product creation and triggered on purchase activity of the at least one user;

a revenue management module for managing the revenue between the publisher and the platform owner in an enterprise model and in a marketplace model, wherein the platform owner is the publisher and a single payment gateway account holder in the enterprise model, and in the marketplace model a revenue share is managed between the publishers and the platform owner, wherein the revenue management module supports display of both settled and non-settled amount of the products between one or more distributors, one or more learner, and the platform owner;

a utilization module for utilizing the learning of content by the learner on the platform; and a distribution module for distributing the purchased learning technologies by at least one distributor to at least one learner as activation tokens to manage enrollments or de-enrollments of the learning technologies, and also enables the at least one user to add a selected product using an activation code for the product generated and distributed by the distributor or publisher.

8. The system of claim 7, further comprising approving the plurality of learning technologies by the platform owner before using the products.

9. The system of claim 7, wherein the one or more users include one or more learners and one or more distributors.

10. The system of claim 7, wherein the learning content is provided in the forms of at least one or more of online courses, discussion forms and communities, events and event groups, internet based online assessments, LAN based classroom assessments, question papers for download, reading material in the form of e-books, videos or tutorials.

11. The system of claim 7, wherein the searching is based in keywords.

12. A non-transitory computer medium storing one or more instruction which when executed by a processor on a system, cause the processor to perform method for aggregating a plurality of learning technologies comprising:

providing a platform by a platform owner for aggregating the plurality of learning technologies with an e-commerce layer over a variety of learning modes, wherein the plurality of learning technologies having learning content;

integrating the plurality of learning technologies as products by respective publishers using an enrollment service framework of the platform;

searching the plurality of learning technologies on the platform by one or more users;

purchasing at least one learning technology out of the plurality of learning technologies by at least one user, wherein the purchase results in the generation of the revenue, wherein at least one user is mapped with the learning content in a content delivery engine through an enrollment rule created during product creation and triggered on purchase activity of the at least one user;

managing the revenue between the publishers and the platform owner using the revenue management module in an enterprise model and in a marketplace model, wherein the platform owner is the publisher and a single payment gateway account holder in the enterprise model, and in the marketplace model a revenue share is managed between the publishers and the platform owner, wherein the revenue management module supports display of both settled and non-settled amount of the products between one or more distributors, one or more learner, and the platform owner;

utilizing the at least one learning technology by the at least one user on the platform; and distributing the purchased learning technologies by at least one distributor to at least one learner as activation tokens to manage enrollments or de-enrollments of the learning technologies, and also enables the at least one user to add a selected product using an activation code for the product generated and distributed by the distributor or publisher.

\* \* \* \* \*